(12) United States Patent
Tom (10) Patent No.: US 8,291,165 B2
(45) Date of Patent: Oct. 16, 2012

(54) ELECTRONIC DEVICES USING REMOVABLE AND PROGRAMMABLE ACTIVE PROCESSING MODULES

(75) Inventor: Joe Tom, Foster City, CA (US)

(73) Assignee: Spansion LLC, Sunnyvale, CA (US)

( * ) Notice: Subject to any disclaimer, the term of this patent is extended or adjusted under 35 U.S.C. 154(b) by 407 days.

(21) Appl. No.: 12/723,589

(22) Filed: Mar. 12, 2010

(65) Prior Publication Data

US 2011/0225348 A1 Sep. 15, 2011

(51) Int. Cl.
*G06F 13/00* (2006.01)
(52) U.S. Cl. ......... 711/115; 703/23; 714/47.1; 711/103; 717/138
(58) Field of Classification Search .................. 711/103, 711/115; 703/23; 714/47.1; 717/138
See application file for complete search history.

(56) References Cited

U.S. PATENT DOCUMENTS

| | | | | |
|---|---|---|---|---|
| 5,915,106 A * | 6/1999 | Ard | ................................. | 703/23 |
| 6,704,230 B1 * | 3/2004 | DeBrosse et al. | ............. | 365/201 |
| 7,024,571 B1 * | 4/2006 | Reger et al. | .................... | 713/323 |
| 7,360,137 B2 * | 4/2008 | Amidon et al. | ............... | 714/736 |
| 7,818,645 B2 * | 10/2010 | Gedamu et al. | ............... | 714/733 |
| 2003/0046631 A1 * | 3/2003 | Gappisch et al. | ............. | 714/763 |
| 2006/0288127 A1 * | 12/2006 | Greer et al. | ........................ | 710/5 |
| 2007/0203687 A1 * | 8/2007 | Durand et al. | .................. | 703/28 |
| 2010/0077063 A1 * | 3/2010 | Amit et al. | .................... | 709/221 |

* cited by examiner

*Primary Examiner* — Jae Yu
(74) *Attorney, Agent, or Firm* — Frommer Lawrence & Haug LLP; Matthew M. Gaffney (57) ABSTRACT

System and methods for assembling electronic devices (110) using removable programmable active processing modules (120) are provided. An active processing module includes a first input/output (I/O) interface (202) and a second I/O interface (204). The active processing module also includes a controller (206) communicatively coupled to the first and the second I/O interfaces, where the controller is configured for selectively operating the active processing module in a programming mode or at least one component mode. In the programming mode, the active processing module is enabled to receive a plurality of operating parameters from a first electronic device via the first I/O interface to configure the active processing module to provide a functionality of a component for a second electronic device via at least one of the first and the second I/O interfaces. In the component mode, the active processing module is configured to operate according to the plurality of operating parameters.

17 Claims, 4 Drawing Sheets

ELECTRONIC DEVICES USING REMOVABLE AND PROGRAMMABLE ACTIVE PROCESSING MODULES

BACKGROUND OF THE INVENTION

1. Statement of the Technical Field

The invention relates to electronic devices. More particularly, the invention relates to electronic devices using removable and programmable active processing modules.

2. Description of the Related Art

Many electronic device designs are tested via a prototyping process in which a functioning version of the electronic device is assembled from a variety of available or custom fabricated components. Thereafter, the performance of the electronic device is tested. If the prototype device does not perform according to the desired specifications, one or more of the components of the prototype device are replaced. In some cases, these components need to be redesigned and remanufactured. This prototyping process is repeated until the performance of the prototype electronic device meets some criteria. In cases where components need to be redesigned and remanufactured during the prototyping process, the costs associated with the fabrication of the prototype can quickly escalate, as many types of electronic components cannot typically be fabricated in small quantities at low cost and in a timely manner.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognizes that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The various embodiments of the invention provide electronic devices assembled using one or more removable and programmable active processing modules. That is, rather than assembling the electronic device using a variety of different, application-specific, customized components, at least a portion of these components are implemented by using active processing modules. In particular, the active processing modules are designed to be programmed to emulate or replicate the functionality of a custom-built component for the electronic device. As a result, an electronic device can be constructed by programming, rather than manufacturing, of components. Further, during a prototyping process, the modules can simply be reprogrammed during each iteration, thus eliminating the need for complex redesign and remanufacturing of at least some of the components. To further facilitate configuration of the active processing modules, modules in accordance with the various embodiments of the invention are configured to be programmed via conventional mass storage input/output (I/O) protocols and interfaces.

Accordingly, the use of such modules provides several advantages over conventional electronic device assembly techniques. First, electronic devices can be more quickly assembled and prototyped, as the time lag typically associated with the design and fabrication of customized components is effectively eliminated. Second, a software-based configuration of components provides an inexpensive way to update or customize functionality for one or more components of the electronic device without requiring specialized equipment. Finally, the use of such modules means that electronic devices can be prototyped or manufactured at a much lower cost without jeopardizing the competitiveness of the selling price position of the electronic device. Further, because of the fewer number of custom components required, it is likely that such electronic devices will have a significantly lower price point as conventional devices utilizing customized components.

Figure 1:
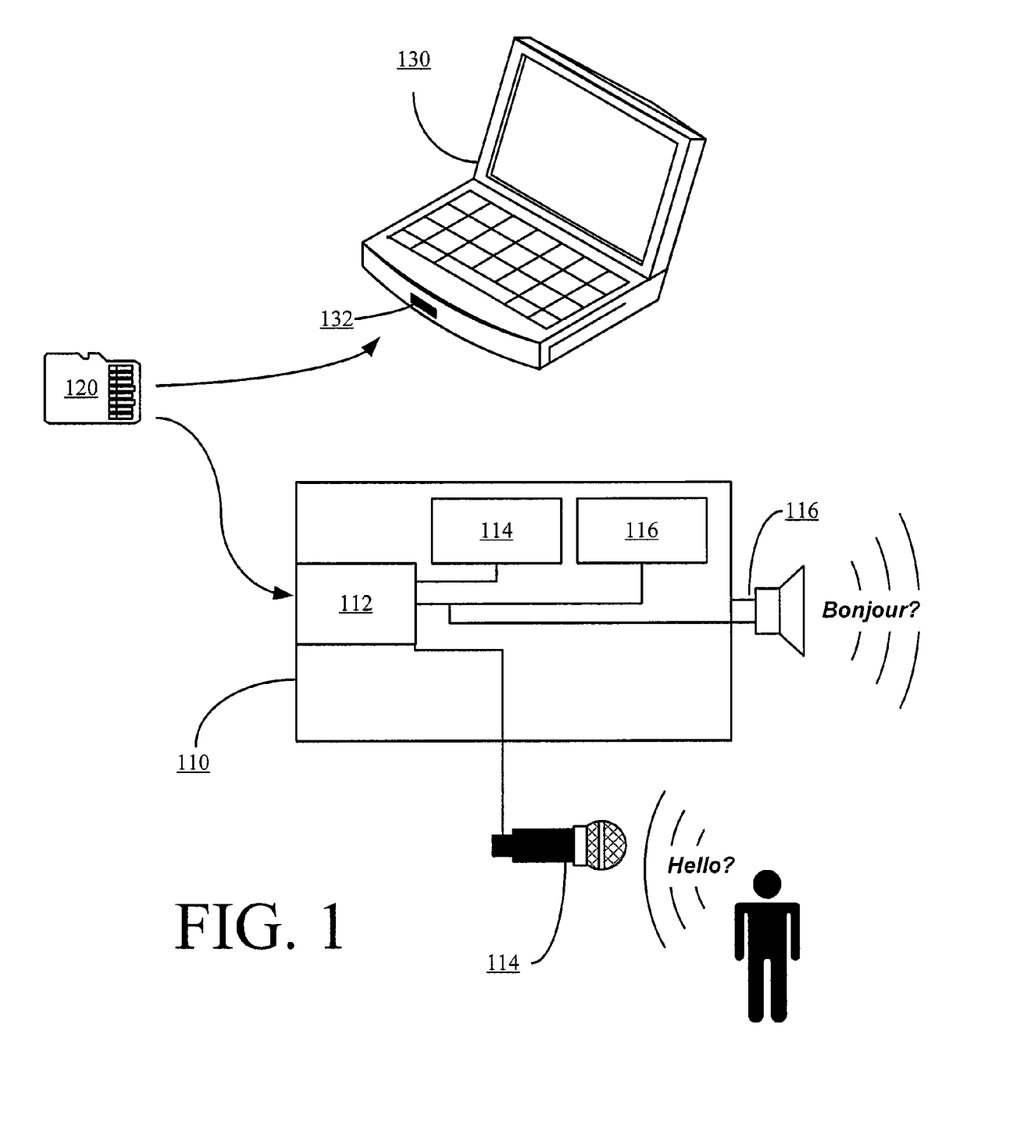
FIG. 1 conceptually shows a method of assembling an electronic device 110 using removable and programmable active processing modules in accordance with an embodiment of the invention.

FIG. 1 conceptually shows a method of assembling an electronic device 110 using removable and programmable active processing modules in accordance with an embodiment of the invention. In the exemplary embodiment illustrated in FIG. 1, device 110 is shown as a language translation device for translating spoken English into spoken French. However, the invention is not limited in this regard and the various embodiments of the invention are equally applicable to any other type of electronic device.

As shown in FIG. 1, an electronic device 110 can include input devices 114, such as a microphone, a keyboard, a mouse, or any other component for providing signals into electronic device 110. Electronic device 110 can also include output devices 116, such as a speaker, a display, or any other component for providing signals to a user or to other electronic devices (e.g., via a network connection). Additionally, electronic device 110 can include an interface 112 for removably interfacing with an active processing module 120 programmed emulate the functionality of a component for the electronic device 110.

In addition to being able to interface with electronic device 110 via interface 112, the active processing module 120 can also be configured to interface with a different electronic device for programming purposes. For example, as shown in FIG. 1, the active processing module 120 can also be configured to interface with programming device 130, such as a general purpose computing device. Further, in the various embodiments of the invention, module 120 is configured to interface with programming device 130 via a mass storage device and conventional mass storage device I/O protocols. In the exemplary embodiment shown in FIG. 1, this is illustrated by configuring the active processing module 120 to have a form factor of a flash memory card and using a programming device 130 having a corresponding flash memory card interface 132 (internal or external) that uses conventional mass storage I/O protocols. As a result, the programming device 130 accesses the module 120 in the same manner as a conventional flash memory card. However, the various embodiments of the invention are not limited to flash memory card form factors.

Assembly is as follows. First, the module 120 is inserted into interface 132 of programming device 130 to begin a programming step. The computing device 130 then runs a software program for configuring the module 120. In some embodiments of the invention, the software program can be stored on module 120 to further facilitate programming of module 120 using various computing devices. Once the module 120 is programmed, it is disengaged from programming device 130 and electronic device 110 is assembled. In particular, module 120 is inserted into interface 112 of electronic device 110. The electronic device 110 can then be powered up. During operation of electronic device, module 120 can be operated in accordance with the configuration of module 120 performed at computing device 120. For example, in the case of FIG. 1, the module 120 is configured to provide a language translation processor for electronic device 110. However, the various embodiments of the invention are not limited in this regard and module 120 can be configured to operate as any other type of component for electronic device 110.

In a prototyping scenario, the performance of electronic device 110 can also be evaluated. Thereafter, if necessary, module 120 can be removed from device 110, reinserted into interface 132, and reprogrammed via programming device 130. The newly reprogrammed module 120 can then be reengaged with electronic device 110.

In order to configure module 120, programming device 130 can use software that is generally operative to perform software development operations and software installation operations for module 120. Notably, the active processing module 120 can be programmed by a programming device comprising a computer workstation, a desktop personal computer system, a laptop personal computer system, or any other general purpose computer processing device. Software development and installation operations are well known to those having ordinary skill in the art, and therefore will not be described herein. The software development applications can include, but are not limited to, a Real Time Operating System (RTOS), a C compiler, a C++ compiler, a Java compiler, a debugger, an emulator, a file system, drivers, FPGA tools, an Integrated Development Environment (IDE) and exemplary codes for controlling a household appliance or other consumer electronic device. Further, although the software development applications can be stored within programming device 130, in some embodiments of the invention, the software development applications are stored within module 120. Accordingly, multiple devices be used as programming device 130 by accessing the software stored with the active processing module 120.

As described above, even though module 120 is configured to operate as a mass storage device for programming device 130, it is also configured to operate as a component of an electronic device performing other tasks requiring at least some amount of data and/or signal processing. Accordingly, module 120 will include additional components as compared to a conventional mass storage device. An exemplary architecture for such an active processing module is shown below in FIG. 2.

Figure 2:
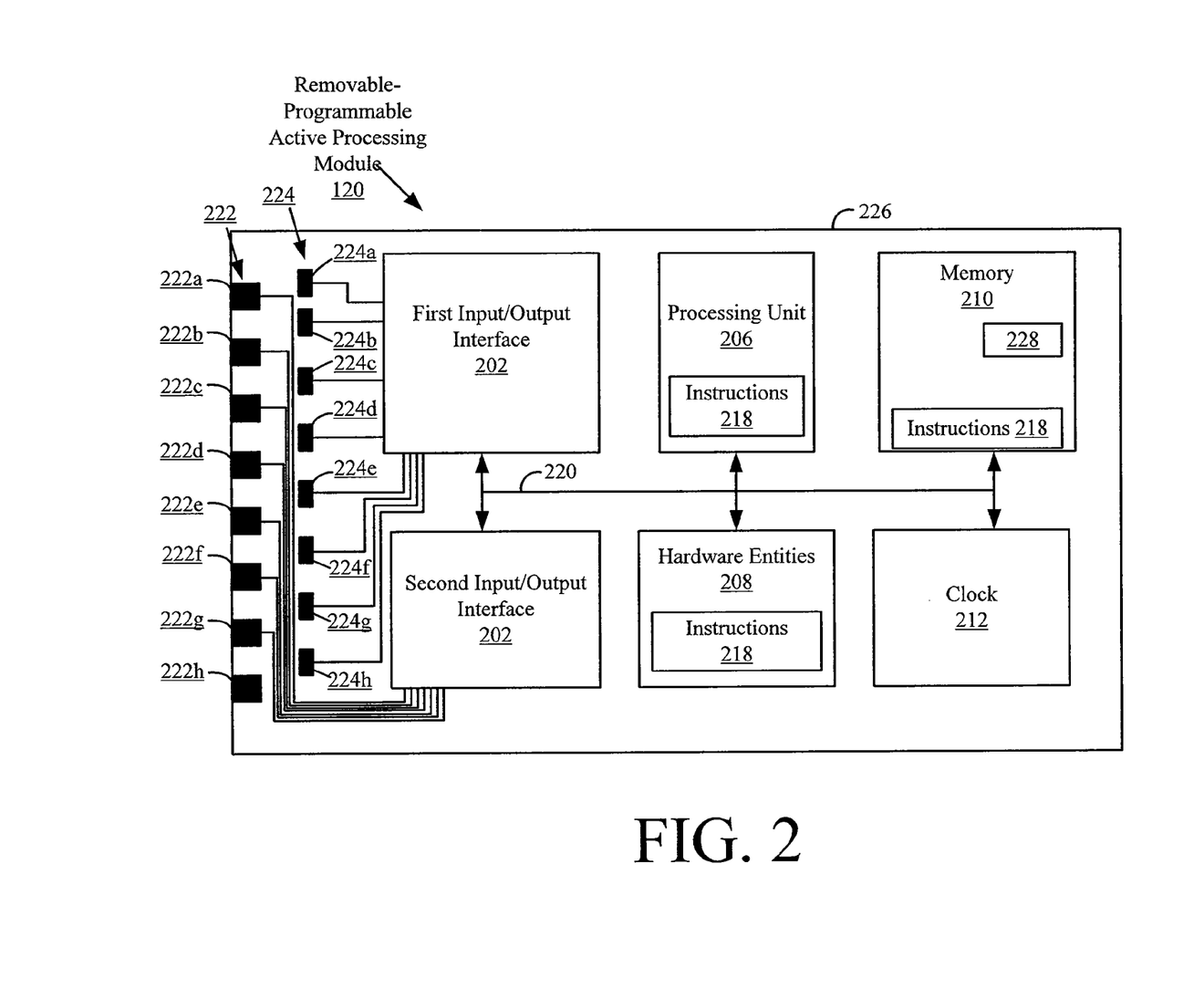
FIG. 2 is a schematic illustration of an exemplary active processing module in accordance with an embodiment of the invention.

FIG. 2 is a detailed block diagram of an exemplary active processing module 120 in accordance with an embodiment of the invention. Although FIG. 2 shows a particular architecture for module 120, an active processing module in accordance with the various embodiments of the invention may include more or less components than those shown in FIG. 2. However, the components shown in FIG. 2 are sufficient to illustrate the various embodiments of the invention.

The hardware architecture of FIG. 2 represents one embodiment of a representative active processing module 120 configured to perform one or more functions for an electronic device by executing various types of software programs and applications. For example, the active processing module 120 can execute an operating system, a compiler, a file system, software development applications, and/or any other software for performing the functions of a component of an electronic device.

According to the some embodiments of the invention, the active processing module 120 can be designed so as to be useful in low power applications and/or high performance application. In some embodiments, the active processing module 120 can also be designed so as to be useful in space sensitive applications. In this regard, it should be understood that the active processing module 120 can be sized and shaped in accordance with the particular electronic device and interfaces thereof. Additionally, the active processing module 120 can have dimensions selected based on die size, thermal dissipation, and the packaging technology employed for packaging the electronic components thereof. However, the various embodiments of the invention are not limited in this regard and the module 120 can be size, shaped, or otherwise physically and/or electrically configured in accordance with any other considerations.

As shown in FIG. 2, the active processing module 120 generally includes a substrate 226 with a plurality of electronic components disposed thereon. For example, the substrate 226 can be a Printed Circuit Board (PCB) or any other type of structure for supporting and interconnecting various electronic components. The electronic components in module 120 include connectors 222, 224, at least one processing unit 206 and at least one system bus 220. The electronic components also include a memory 210 connected to and accessible by other portions of active processing module 120 through the system bus 220. In the various embodiments of the invention, the memory 210 can include volatile and/or non-volatile memory. For example, the memory 210 can include, but is not limited to, Random Access Memory (RAM), such as Dynamic Random Access Memory (DRAM) and Static Random Access Memory (SRAM), Read Only Memory (ROM), and flash memory, a disk drive, and/or other types of mass storage elements. The electronic components further include Input/Output (I/O) interfaces 202 and 204 for coupling connectors 222 and 224, respectively, to system bus 220, a clock 212, and hardware entities 208. In some embodiments of the invention, at least some of the hardware entities 208 perform actions involving access to and use of memory 210.

As described above, the I/O interface 202 is communicatively coupled to connector 222. The connector 222 comprises a plurality of pads 222a, 222b, 222c, 222d, 222e, 222f, 222g, 222h formed of a conductive material. The pads 222a, . . . , 222h are electrically isolated from each other. The pads 222a, . . . , 222h provide electrical contacts for electrically connecting the active processing module 120 to one or more several external electronic devices, such as programming device 130 and/or electronic device 120, as shown in FIG. 1. The pads 222a, . . . , 222h may be recessed or raised relative to a surface of the substrate 226. One or more of the pads 222a, . . . , 222h can be provided for electrically connecting a power source to the active processing module 120 during a programming step.

In the various embodiments of the invention, the I/O interface 202 and connector 222 are configured to operate in at least a mass storage or programming mode. That is, the I/O interface 202 and connector 222 are configured to interface with a programming device via a conventional mass storage device interface and conventional mass storage protocols. For example, the connector 222 can be sized and shaped to mate with a flash memory card connector of a general purpose computing device, as described above with respect to FIG. 1. Further, when the active processing module 120 is coupled to the programming device, the I/O interface 202 configures itself by default to match with the programming device in terms of the electrical interface and protocol standard. For example, the I/O interface 202 can be configured to operate as a Secure Digital Input Output (SDIO) interface, a Universal Asynchronous Receiver/Transmitter (UART) interface, an I2C interface, a USB interface and/or Radio Frequency (RF) interface, to name a few. Thereafter, the programming device can be used to modify the contents of memory 210 and other memory locations in module 120 to reflect the desired functionality for module 120, as described below. The I/O interface can include Field Programmable Gate Arrays (FPGA), Applications Specific Integrated Circuits (ASIC), and/or other hardware customized for the intended I/O electrical characteristics and functions.

The second I/O interface 204 is similar communicatively coupled to the connector 224. Connector 224 also comprises a plurality of pads 224a, 224b, 224c, 224d, 224e, 224f, 224g, 224h formed of a conductive material. The pads 224a, . . . , 224h are electrically isolated from each other. The pads 224a, . . . , 224h provide electrical contacts for electrically connecting the active processing module 120 to an electronic device, such as electronic device 110 in FIG. 1. The pads 224a, . . . , 224h may also be recessed or raised relative to a surface of the substrate 226. In operation as a component of an electronic device, one or more of the pads 222a, . . . , 222h and/or pads 224a, . . . , 224h can be used for electrically connecting a power source to the active processing module 120.

In FIG. 2, connectors 222 are shown as edge connectors. However the various embodiments of the invention are not limited in this regard and each of connectors 222 and 224 can be configured as edge or non-edge connectors. Further, although each of the connectors 222, 224 are shown in FIG. 2 to each include eight (8) electrical contacts 222a, . . . , 222h, 224a, . . . , 224h, embodiments of the invention are not limited in this regard. Each connector 222, 224 can include any number of electrical contacts.

In the various embodiments of the invention, the pads 224a, . . . , 224h are also positioned such they fail to make electrical contact with a programming device during the programming mode. That is, they are positioned to avoid contact with electrical connectors in an interface of programming device for contacting pads 222a, . . . , 222h. For example, in the case of an active processing module having a secure digital (SD) flash memory card form factor, pads 222a, . . . , 222h can be the conventional set of contacts typically included in SD memory cards and configured to mate with a conventional SD memory card socket of a programming device. Pads 224a, . . . , 224h can be a second set of contacts elsewhere on the surface of the device to avoid contact with existing connectors in the conventional SD memory card socket of the programming device. For example, pads 224a, . . . , 224h can be used to form a second row of contacts below the first row of conventional SD memory card contacts.

According to some embodiments of the invention, the I/O interface 202 and/or I/O interface 204 will be automatically configured to communicatively couple the active processing module to the electronic device by performing the following operations. First, the I/O interfaces 202, 204 are automatically powered on when the active processing module 120 is inserted into the matching connector of an electronic device. When powered on, the processing unit 206 of the removable programmable active processing module 120 executes a boot code from the local memory storage unit 210. The boot code comprehends the required self-configuration for the I/O interfaces 202 and/or 204. Thereafter, boot code enables communications between the active processing module 120 and the electronic device. However, the various embodiments of the invention are not limited in this regard and other configuration processes can also be used.

In some embodiments, an automatic selection between a programming mode and a component mode can be provided based on timing of signals. That is, the active processing module 120 can be configured to wait for a first period of time after power up for signals associated with a mass storage interface to appear at connector 222 and I/O interface 202. If such signals appear before the end of this time period, the active processing module 120 can automatically self-configure to operate as a mass storage device. If this period of time elapses and no signals are received, the active processing module can automatically self-configure to operate as a component.

In the various embodiments of the invention, an interface of an electronic device is configured to make contact with at least one I/O interfaces 202 and 204. Therefore, in the various embodiments of the invention, at least one of I/O interfaces 202 and 204 enables communication of information from the electronic device (not shown in FIG. 2) to the active processing module 120, and vice versa. Consequently, the active processing module 120 can interact with the electronic system to provide the functionality of a component for the electronic system according to the programming performed using a computing device.

In the various embodiments of the invention, the I/O interfaces 202 and 204 can be configured in a variety of ways during a component mode. For example, in some embodiments of the invention, I/O interface 202 can continue to operate as a mass storage device interface and any additional functionality can be provided via I/O interface 204. In other embodiments of the invention, the I/O interface 202, used alone or in combination with I/O interface 204, can have a different configuration in a programming mode as opposed to the component mode. That is, the type of signals associated with one or more of pads 222a, . . . , 222h can be different in each mode. In yet other embodiments of the invention, the functionality of the component can be provided via one or both of interfaces 202 and 204. That is, the module can be programmed to operate as component for an electronic device via pads from solely connector 222, solely connector 224, or any combination thereof.

As described above, the operation of the module 120 during a component mode is configured by specifying operating parameters for module 120. That is, during the programming mode, the contents of memory 210, including instructions 218, can be modified to enable the desired functionality for module 120 in an electronic device.

Although many, if not all, component tasks for module 120 can be performed by programming general purpose processing unit 206 to handle such tasks, in some cases the processing unit 206 will not be able to handle such tasks efficiently. Accordingly, in some embodiments of the invention, the module 120 is configured such that at least some tasks are instead performed by hardware entities 208, which may be configured for efficiently performing such tasks. In these embodiments, hardware entities 208 can include Field Programmable Gate Arrays (FPGAs), Application Specific Integrated Circuits (ASICs), and/or other hardware customized for a particular use. Consequently, rather than programming the processing unit 206 to perform all component tasks for the electronic device, the module 120 can be configured to rely on hardware entities 208 to perform at least a portion of the component tasks.

As shown in FIG. 2, the hardware entities 208 also include a computer-readable storage medium on which is stored one or more sets of instructions 218 (e.g., software code) configured to implement one or more of the methodologies, procedures, or functions described herein. The instructions 218 for hardware entities 208 can also reside, completely or at least partially, within the memory 210 and/or within the processing unit 206 during execution thereof by the active processing module 120. The memory 210 and the processing unit 206 also can constitute machine-readable media. In this regard, it should be understood that the hardware entities 208 can access and run software stored in the memory 210 or instructions 218 of the active processing module 120.

During the programming mode, a computing device can be used for defining and/or modifying values for operating parameters of the module 120 for purposes of interacting with an electronic device. In this regard, it should be understood that the computing device can access and run parameter setting applications 228 stored in memory 210 of the active processing module 120 or elsewhere. The parameter setting applications 228 are generally operative to perform parameter setting operations for any components of module 120. The parameter setting operations can involve, but are not limited to, prompting a user to input a value for a particular operating parameter and storing the inputted value in memory 210 or any other instruction 218 locations in module 120. For example, the operating parameters can specify particular instructions or values for processing unit 206 or hardware entities 208 comprising an ASIC or other types of software-driven processors. Additionally, the operating parameters can also specify the interconnection of logic blocks required for hardware entities 208 comprising an FPGA and/or values and instructions for the FPGA.

According to some embodiments of the invention, the active processing module 120 can be a plug-and-play device. In this regard, the software stored locally on the active processing module 120 will automatically be executed at power up of the active processing module 120 by the processing unit 206. Thereafter, the processing unit 206 can send commands and other information to the electronic device via the I/O interfaces 202 and/or 204. The processing unit 206 can also receive information from the consumer electronic device via the I/O interfaces 202 and/or 204. However, the various embodiments of the invention are not limited in this regard.

As described above, active processing modules in accordance with the various embodiments of the invention are used to emulate or replace the functionality of components in an electronic device. For example, as described above in FIG. 1, a module 120 is used in electronic device 110 to provide the functionality of a language translation processor. However, the various embodiments of the invention are not limited in this regard. Further, in the various embodiments of the invention, electronic devices are not limited to use of a single active processing module. Rather, multiple active processing modules can be used to provide the functionality of various types of components of an electronic device. For example, active processing modules can be used to provide a central processing unit, a graphics processing unit, a signal processing unit, a memory unit, memory controllers, audio and/or video decoders and encoders, and system/bus bridging devices, to name a few. However, the various embodiments of the invention are not limited in this regard and many other types of components of an electronic device can be implemented via active processing modules.

Figure 3:
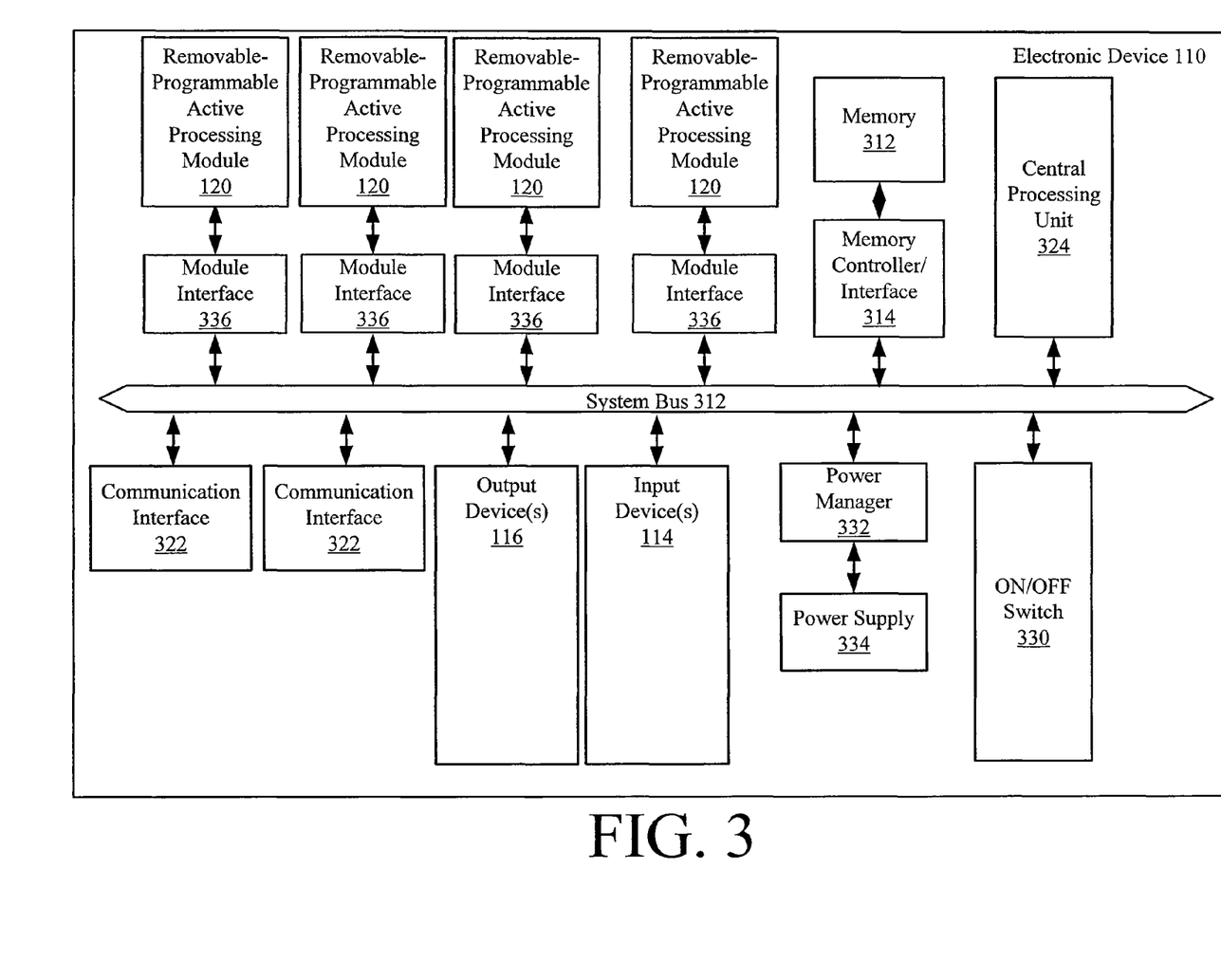
FIG. 3 is a block diagram of an exemplary electronic device in accordance with an embodiment of the invention.

A detailed block diagram of an exemplary electronic device 110 in accordance with the various embodiments of the invention is provided in FIG. 3. The electronic device 110 may include more or less components than those shown in FIG. 3. However, the components shown are sufficient to illustrate the various embodiments of the invention.

In FIG. 3, the device 110 is generally configured as general purpose computing device having at least one system bus 312 and having input 114 and output devices 116, as described above with respect to FIG. 1. Device 110 further includes a memory 318 and a memory controller/interface 320 communicatively coupling memory 318 to system bus 312, one or more communications interfaces 322, and a central processing unit 324. Device 110 further includes components for managing power up and power down of electronic device 110, such as an ON/OFF switch 330, a power manager 332 communicatively coupled to switch 330 via bus 312, and power supply 334.

The CPU 324 performs actions involving access to and use of memory 312. Memory 312 includes volatile and/or non-volatile memory. For example, the memory 320 can include, but is not limited to, Random Access Memory (RAM), such as Dynamic Random Access Memory (DRAM) and Static Random Access Memory (SRAM), Read Only Memory (ROM), flash memory, a disk drive, and/or other forms of program bulk-storage. One or more device-control applications are stored in memory 320 and executed by the CPU 324. The device-control applications are generally operative to control operations of the electronic device 110 and components therein such that it performs its primary function. In this regard, the CPU 324 may perform actions for controlling the operations of the electronic device in accordance with a user input. The user input is facilitated by the on/off switch 106, input devices 114, and output devices 116.

In addition to the components described above, electronic device 110 is also configured to operate using one or more removable and programmable active processing modules 120, as described above. In this regard, electronic device 110 includes one or more module interfaces 336 for communicatively coupling active processing modules 120 to system bus 312. As described above, the module interfaces 336 can be configured to interface with any of the connectors present on the active processing modules 120. Thus, the module interfaces 336 can be physically configured to be the same or different as the interface of a programming device. In some embodiments of the invention, the module interfaces 336 can be identically configured to provide flexibility in design and configuration. However, the various embodiments of the invention are not limited in this regard and one or more of module interfaces 336 can be configured different. Such a configuration can be used, for example, to ensure that only active processing modules configured to provide the certain types of components are used are certain points in the electronic device 110. For example, it may be desirable to locate a graphics processor unit at a certain point on system bus 312. Additionally, in embodiments using multiple buses, the number and types of signal on one bus may be different than for another bus. Further, placement of some components in incorrect location could damage electronic device 110.

In the embodiment illustrated in FIG. 3, the operations of electrical device 110 are controlled by central processing unit 324 and using memory 312. However, the various embodiments of the invention are not limited in this regard. In some embodiments of the invention, electronic device 110 can also be controlled by one or more of active processing modules 120. In this scenario, active processing modules 120 can be configured to provide the CPU and/or working memory for electronic device 110. In some embodiments of the invention, when an active processing module 120 configured to provide CPU functionality is inserted into one of interfaces 336, an existing CPU, such as CPU 324 can be inhibited from controlling operations of the electronic device. However, the various embodiments of the invention are not limited in this regard. For example, such an active processing module 120 can also be configured to concurrently operate with CPU 324 via a master/slave or slave/master arrangement. Similarly, an active processing unit 130 can also be configured to replace or supplement an existing memory system of electronic device 110, such as memory 312 and controller 314.

Figure 4:
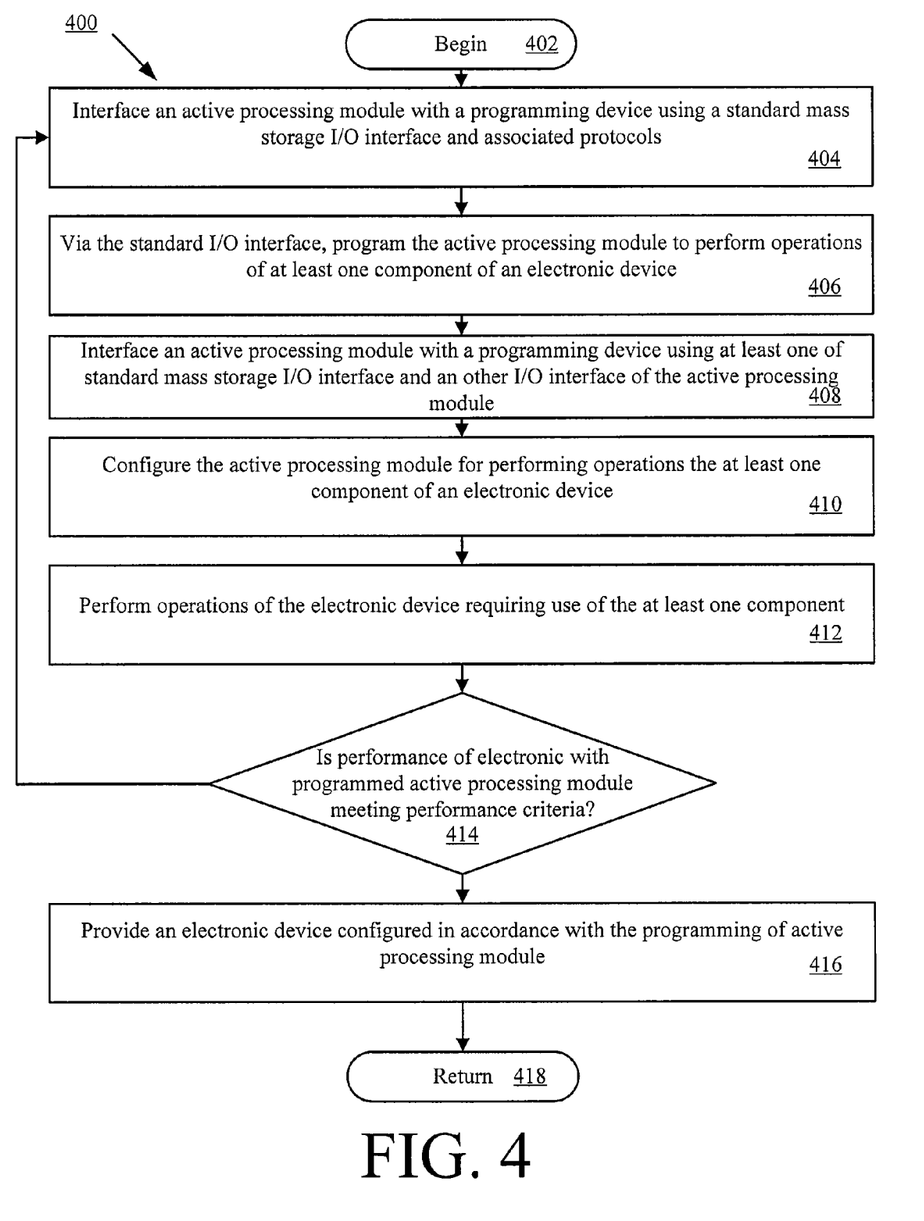
FIG. 4 is a flow diagram of an exemplary method for assembling an electronic device in accordance with an embodiment of the invention.

Referring now to FIG. 4, there is provided a flow diagram of an exemplary method 400 for assembling and/or prototyping an electronic device (e.g., the electronic device 100 of FIG. 1). As shown in FIG. 4, the method begins with step 402 and continues with step 404. Step 404 involves interfacing the active processing module with a programming device using a conventional I/O interface of the active processing module (e.g., connectors 222 and interface 202 of module 120 in FIG. 2) and a matching interface of the programming device. As described above, the programming device can include, but is not limited to, a computer workstation, a desktop personal computer system, a laptop personal computer system, or any other general purpose computer processing device.

In a next step 406, the active processing module (e.g., active processing module 120) is programmed to perform operations of a component of an electronic device (e.g., the electronic device 110 of FIGS. 1 and 3). For example, as described above, the active processing module can be configured to operate as a central processing unit, a graphics processing unit, a signal processing unit, a memory unit, memory controllers, audio and/or video decoders and encoders, and/or system/bus bridging devices. However, the various embodiments of the invention are not limited in this regard and the active processing module can be configured to operate as any other type of component for the electronic device. Further, the programming step can be performed at any time and not just at assembly of an electronic device. For example, the active processing module can be initially preprogrammed by a manufacturer or an end user and stored for later use. Thereafter, the end user can use a programming device to reprogram the active processing module, if necessary.

As described above, the active processing module can be a plug-and-play device. In this scenario, software stored in the active processing module is executed at power-up of the active processing module to allow it to enter a programming mode in which the active processing module is configured as a mass storage device, as described above. Thereafter, a consumer or manufacturer, via the programming device, can modify the existing operating parameters on the active processing module and/or develop new operating parameters for the active processing module using the software executing on the programming device. The modified and/or new operating parameters can then be stored in the active processing module.

After completing step 406, the method 400 continues with step 408. In step 408, the programmed active processing module (e.g., active processing module 120) is engaged with an electronic device (e.g., the electronic device 110). In this regard, it should be emphasized that the electronic device has a connector or other interface (e.g., module interface 336 of FIG. 3) that mates with a respective connector (e.g., connectors 222, 224 in FIG. 2) of the active processing module.

Subsequent to the insertion of the active processing module into the electronic device at step 408, step 410 is performed where the active processing module is configured for operation as a component for the electronic device. The device interfacing is achieved using signals via one or more of the I/O interfaces (e.g., I/O interface 202 and/or 204 of FIG. 2) of the active processing module and a module interface (e.g., the module interface 336 of FIG. 4) of the electronic device.

As described above, the active processing module can be a plug-and-play device. In this scenario, software stored in the active processing module is executed at power-up of the active processing module in response to signal from the electronic device to allow it to enter a component mode. Thereafter, the active processing module configures itself for operation according to the operating parameters provided at step 406.

Configuration of the active processing module during power up can be completed in a variety of ways, as described above. For example, the active processing module can include software to automatically configure the module in one of a component and programming mode based on signals at the interfaces of the active processing module. Additionally, as described above, the active processing modules can automatically configure the module in one of the component and programming modes based on a timing of mass storage protocol signals.

Upon competing step 410, step 412 is performed. In step 412, operations of the electronic device are performed that require use of the at least one component whose functionality the active processing module is configured to provide. Accordingly, as the electronic device performs such operations, it will instead access the active processing module. Afterwards, at step 414, the performance of the electronic device with the active processing module is evaluated. In particular, the performance is evaluated to determine if a performance criteria is met. For example, the performance of the electronic device can be compared to one or more device specifications. If the criteria is not met at step 414, the active processing module can be reprogrammed starting at step 404 and re-evaluated. If the criteria is met at step 414, the method 400 continues to step 416.

At step 416, an electronic device, configured in accordance with the programming of the active processing module, can be provided. In some embodiments of the invention, this can include designing and manufacturing components for an electronic device in accordance with the programming of the active processing module. In other embodiments of the invention, this can include providing electronic devices that include active processing modules programmed in accordance with the active processing modules used during the prototyping stage. Upon completing step 412, the method 400 ends at 418. Alternatively, method 200 can be repeated at step 402 to perform additional configuration of the electronic device or to design and assemble other types of electronic devices.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A method of assembling an electronic system using at least one active processing module having a first input/output (I/O) interface and a second I/O interface, comprising: communicatively coupling said active processing module and a first electronic device using said first I/O interface; programming a plurality of operating parameters for said active processing module using said first electronic device to configure said active processing module to provide a functionality of a component in a second electronic device; communicatively coupling said active processing module and said second electronic device using at least one of said first and said second I/O interfaces; and performing operations of said second electronic device requiring said component using said active processing module, wherein said programming further comprises configuring said active processing module to operate as an electronic component selected from the group consisting of a central processing unit, a graphics processing unit, a signal processing unit, a memory controller, a memory module, and an electronic device bridging unit.

2. The method of claim 1, further comprising:
evaluating a performance of said active processing module during said operations; and
if said performance meets a performance criteria, designing said component for said second electronic device based on said programming, else repeating said interfacing, programming, interfacing, performing, evaluating steps using a new value for at least one of said plurality of operating parameters.

3. The method according to claim 1, wherein said programming further comprises setting a value for at least one of a plurality of operating parameters of said electronic device using parameter setting software stored on said active processing module.

4. The method of claim 1, wherein said coupling said active processing module and said first electronic device further comprises executing application development software on said first electronic device.

5. The method of claim 1, wherein said coupling said active processing module and said first electronic device further comprises:
providing a set of configuration commands at said first I/O interface associated with a mass storage device I/O protocol; and
automatically configuring said active processing module to operate as a mass storage device for said first electronic device responsive to said set of configuration commands.

6. The method of claim 1, wherein said coupling said active processing module and said second electronic device further comprises:
waiting for a first period of time for a set of configuration commands at said first I/O interface associated with a mass storage device I/O protocol; and
if said set of configurations commands appear during said first period of time, automatically configuring said active processing module to operate as a mass storage device for said second electronic device, else automatically configuring said active processing module to operate as said component for said second electronic device.

7. A programmable active processing module, comprising:
a first input/output (I/O) interface; a second I/O interface; a controller communicatively coupled to said first and said second I/O interfaces, said controller configured for selectively operating said active processing module in a programming mode or at least one component mode, said programming mode comprising enabling said active processing module to receive a plurality of operating parameters from a first electronic device via said first I/O interface to configure said active processing module to provide a functionality of a component for a second electronic device via at least one of said first and said second I/O interfaces, and said component mode comprising configuring said active processing module to operate according to said plurality of operating parameters, wherein said controller is further configured during said component mode for configuring said active processing module to operate as an electronic component selected from the group consisting of a central processing unit, a graphics processing unit, a signal processing unit, a memory controller, a memory module, and an electronic device bridging unit.

8. The active processing module of claim 7, wherein said controller further comprises at least one central processing unit, at least one memory element, and at least one field-programmable gate array (FPGA) element.

9. The active processing module of claim 7, wherein said controller is further configured during said programming mode for setting a value for at least one of said plurality of operating parameters using parameter setting software stored on said active processing module.

10. The active processing module of claim 7, wherein said controller is further configured during said programming mode for setting a value for at least one of said plurality of operating parameters using application development software executed on said first electronic device.

11. The active processing module of claim 7, wherein controller is configured for selecting said programming mode responsive to detecting a set of configuration commands at said first I/O interface associated with a mass storage device I/O protocol.

12. The active processing module of claim 7, wherein controller is configured for automatically configuring said active processing module to operate as a mass storage device for said first electronic device during said programming mode.

13. The active processing module of claim 7, wherein controller is configured for selecting said programming mode responsive to waiting a first period of time for a set of configuration commands at said first I/O interface associated with a mass storage device I/O protocol, and if said set of configurations commands appear during said first period of time, automatically configuring said active processing module to operate as a mass storage device for said second electronic device, else automatically configuring said active processing module to operate as said component for said second electronic device.

14. An electronic system comprising:
at least one external input/output (I/O) component; at least one removable active processing module having a first I/O interface and a second I/O interface, said active processing module configured for selectively operating in a mass storage mode and at least one processing mode, said programming mode comprising enabling said active processing module to receive a plurality of operating parameters from a programming device via said first I/O interface to configure said active processing module to provide a functionality of an internal component for said electronic system via at least one of said first and said second I/O interfaces, and said component mode comprising configuring said active processing module to operate according to said plurality of operating parameters; and at least one interface component for communicatively coupling said external I/O component and said active processing module, wherein said active processing module is configured during said processing mode to operate as an electronic component selected from the group consisting of a central processing unit, a graphics processing unit, a signal processing unit, a memory controller, a memory module, and an electronic device bridging unit.

15. The programmable active processing module of claim 7, wherein said controller further comprises at least one central processing unit, at least one memory element, and at least one field-programmable gate array (FPGA) element.

16. The active processing module of claim 7, wherein active processing module is configured to monitor said first I/O interface for a first period of time at power-up and select one of said mass storage and said processing modes, wherein said active processing module is configured to select said mass storage mode if a set of configuration commands associated with a mass storage device I/O protocol are received said first I/O interface during said first period, else said active processing module is configured to select said processing mode.

17. The active processing module of claim 7, wherein said active processing element is further configured to store application development software executable by an external computing device interfacing with said active processing element via said first I/O interface for setting a value for at least one of said plurality of operating parameters using parameter setting software stored on said active processing module.

* * * * *